United States Patent
Tomita et al.

(10) Patent No.: US 11,111,381 B2
(45) Date of Patent: Sep. 7, 2021

(54) POLYCARBONATE RESIN COMPOSITION FOR OPTICAL COMPONENT, AND OPTICAL COMPONENT

(71) Applicant: Mitsubishi Engineering-Plastics Corporation, Minato-ku (JP)

(72) Inventors: Keisuke Tomita, Hiratsuka (JP); Akira Ohshima, Hiratsuka (JP)

(73) Assignee: Mitsubishi Engineering-Plastics Corporation, Minato-ku (JP)

( * ) Notice: Subject to any disclaimer, the term of this patent is extended or adjusted under 35 U.S.C. 154(b) by 67 days.

(21) Appl. No.: 16/603,022

(22) PCT Filed: Mar. 26, 2018

(86) PCT No.: PCT/JP2018/012179
§ 371 (c)(1),
(2) Date: Oct. 4, 2019

(87) PCT Pub. No.: WO2018/225340
PCT Pub. Date: Dec. 13, 2018

(65) Prior Publication Data
US 2020/0190320 A1    Jun. 18, 2020

(30) Foreign Application Priority Data

Jun. 5, 2017 (JP) ................. 2017-110793
Mar. 22, 2018 (JP) ................. 2018-053928

(51) Int. Cl.
*C08L 69/00* (2006.01)
*C08L 71/02* (2006.01)
*G02B 1/04* (2006.01)

(52) U.S. Cl.
CPC ......... *C08L 69/00* (2013.01); *C08L 71/02* (2013.01); *G02B 1/045* (2013.01); *C08L 2201/08* (2013.01)

(58) Field of Classification Search
CPC ............... C08L 69/00; C08L 71/02
See application file for complete search history.

(56) References Cited

U.S. PATENT DOCUMENTS

| | | | |
|---|---|---|---|
| 5,977,206 A | 11/1999 | Miya et al. | |
| 2016/0122533 A1 | 5/2016 | Tomita et al. | |
| 2016/0326365 A1 | 11/2016 | Sakaki et al. | |
| 2017/0275422 A1 | 9/2017 | Takimoto et al. | |
| 2018/0051133 A1* | 2/2018 | Chun | |
| 2020/0010670 A1* | 1/2020 | Torii | .......... C08L 63/00 |

FOREIGN PATENT DOCUMENTS

| | | |
|---|---|---|
| JP | 9-249804 A | 9/1997 |
| JP | 2012-207230 A | 10/2012 |
| JP | 2015-180709 A | 10/2015 |
| JP | 2016-130298 A | 7/2016 |
| WO | WO 2015/087526 A1 | 6/2015 |
| WO | WO 2016/060220 A1 | 4/2016 |
| WO | WO 2016/199783 A1 | 12/2016 |
| WO | WO-2018190258 A1 * | 10/2018 ............ C08K 5/524 |

OTHER PUBLICATIONS

Bahadur P.; Sastry, N. V.; Principles of Polymer Science. Alpha Science International Ltd. 2002. pp. 110-128. (Year: 2002).*
Japanese Application 2017-016647. Filed Jan. 2, 2017. (Year: 2017).*
Machine translation of Japanese Application 2017-016647. Filed Jan. 2, 2017. (Year: 2017).*
Machine Translation of WO2018/190258 A1. Oct. 18, 2018. (Year: 2018).*
Partial Written Translation of WO2018/190258 A1. Oct. 18, 2018. (Year: 2018).*
Application JP2017-080086. Filed Apr. 13, 2017. (Year: 2017).*
Machine Translation of JP2017-080086. Filed Apr. 13, 2017 (Year: 2017).*
NOF Corporation. Comprehensive Catalog: Oleo & Specialty Chemicals Division. p. 59. Aug. 28, 2015. (Year: 2015).*
International Search Report dated Jun. 5, 2018 in PCT/JP2018/012179 filed Mar. 26, 2018.

* cited by examiner

*Primary Examiner* — Stephen E Rieth
(74) *Attorney, Agent, or Firm* — Oblon, McClelland, Maier & Neustadt, L.L.P.

(57) ABSTRACT

A polycarbonate resin composition for an optical component, the composition comprising 0.1 to 4 parts by mass of a polyalkylene glycol (B) and 0.005 to 0.5 parts by mass of a phosphorus-containing stabilizer (C) relative to 100 parts by mass of a polycarbonate resin (A), wherein the polyalkylene glycol (B) contains 40 to 80 mol % of a tetramethylene glycol unit (b1), 5 to 45 mol % of a (2-methyl)ethylene glycol unit (b2), and 5 to 50 mol % of an ethylene glycol unit (b3), and wherein at least two units selected from the tetramethylene glycol unit (b1), the (2-methyl)ethylene glycol unit (b2), and the ethylene glycol unit (b3) are contained as a copolymer component obtained by copolymerizing them.

7 Claims, 1 Drawing Sheet

POLYCARBONATE RESIN COMPOSITION FOR OPTICAL COMPONENT, AND OPTICAL COMPONENT

TECHNICAL FIELD

The present invention relates to a polycarbonate resin composition for an optical component, and to an optical component, and more specifically relates to a polycarbonate resin composition for an optical component, which exhibits excellent transparency, thermal discoloration resistance and mold release properties, and to an optical component obtained by molding same.

BACKGROUND ART

Liquid crystal display devices used in personal computers, mobile telephones, and the like, include planar light source devices in order to meet demands for reduced thickness and weight, reduced energy consumption and higher resolution. In addition, such planar light source devices are devices in which one surface is provided with a light guide plate having a wedge-shaped cross section having a uniform slanted surface or a panel-shaped light guide plate in order to achieve the effect of uniformly and efficiently guiding incident light to the liquid crystal display side.

This type of light guide plate can be obtained by injection molding a thermoplastic resin, and a relief pattern is imparted through transfer to a relief part formed on a surface of a liner. In the past, light guide plates were formed from resin materials such as polymethyl methacrylate (PMMA), but in recent years, there have been demands for display devices that project more vivid images, and because temperatures inside apparatuses tend to increase as a result of heat generated in the vicinity of a light source, conventional resin materials are being replaced by polycarbonate resin materials, which exhibit higher heat resistance.

Polycarbonate resins exhibit excellent mechanical properties, thermal properties, electrical properties and weather resistance, but exhibit lower transparency than PMMA and the like, and problems such as low brightness therefore occur in cases where a planar light source is constituted from a polycarbonate resin light guide plate and a light source. In addition, there have been demands in recent years for a reduction in differences in chromaticity between an incident part of a light guide plate and a position distant from the incident part, but polycarbonate resins are more likely to suffer from problems such as yellowing than PMMA resins.

In particular, hand held terminals such as smartphones and tablets have become either thinner or larger and thinner at a remarkable rate in recent years, and edge type configurations, in which incidence of light onto a light guide plate occurs from a side edge rather than from below have come to be used, and there are now demands for ultrathin light sources to exhibit sufficient brightness even at long light path lengths. Such high end light guide plates are currently unlikely to meet required specifications in terms of transparency and yellowing resistance, which were achieved by the prior art mentioned above.

In PTL 1, the inventors of the present invention proposed a polycarbonate resin composition obtained using a polyalkylene glycol copolymer having a specific alkylene glycol unit. This composition is an excellent material that can achieve high light transmittance and good color hue, but was found to be somewhat poor in terms of mold release properties when injection molded.

CITATION LIST

Patent Literature

[PTL 1] JP 2016-130298 A

SUMMARY OF INVENTION

Technical Problem

The present invention has been developed in view of the circumstances mentioned above, and the object (issue) of the present invention is to provide a polycarbonate resin composition for an optical component, which exhibits excellent transparency, thermal discoloration resistance and mold release properties without sacrificing characteristics inherent in polycarbonate resins in any way.

Solution to Problem

As a result of diligent research carried out in order to achieve this purpose, the inventors of the present invention found that by blending a polyalkylene glycol containing specific amounts of three types of alkylene glycol unit and blending a specific amount of a phosphorus-containing stabilizer in a polycarbonate resin, it was possible to achieve excellent transparency, thermal discoloration resistance and mold release properties, and thereby completed the present invention.

The present invention relates to an optical component of the following polycarbonate resin composition for an optical component.

[1] A polycarbonate resin composition for an optical component, the composition comprising 0.1 to 4 parts by mass of a polyalkylene glycol (B) and 0.005 to 0.5 parts by mass of a phosphorus-containing stabilizer (C) relative to 100 parts by mass of a polycarbonate resin (A), wherein the polyalkylene glycol (B) contains 40 to 80 mol % of a tetramethylene glycol unit (b1), 5 to 45 mol % of a (2-methyl)ethylene glycol unit (b2), and 5 to 50 mol % of an ethylene glycol unit (b3), and wherein at least two units selected from the tetramethylene glycol unit (b1), the (2-methyl)ethylene glycol unit (b2), and the ethylene glycol unit (b3) are contained as a copolymer component obtained by copolymerizing them.

[2] The polycarbonate resin composition for an optical component according to [1] above wherein the (2-methyl)ethylene glycol unit and/or ethylene glycol unit in the polyalkylene glycol (B) is contained as a copolymer copolymerized with the tetramethylene glycol unit.

[3] The polycarbonate resin composition for an optical component according to [1] or [2] above, wherein the (2-methyl)ethylene glycol unit and the ethylene glycol unit in the polyalkylene glycol (B) is contained as the copolymer copolymerized with the tetramethylene glycol unit.

[4] The polycarbonate resin composition for an optical component according to any one of [1] to [3] above, wherein the number average molecular weight of the polyalkylene glycol (B) is more than 1200 and less than 5000.

[5] An optical component obtained by molding the polycarbonate resin composition according to any one of [1] to [4] above.

Advantageous Effects of Invention

The polycarbonate resin composition for an optical component of the present invention exhibits excellent transparency, thermal discoloration resistance and mold release properties, and can therefore be advantageously used in a variety of optical components, and especially thin-walled optical components and the like.

BRIEF DESCRIPTION OF DRAWINGS

FIGS. 2(a) and 2(b) are schematic views for explaining a method for evaluating mold release properties in Examples.

Figure 1:
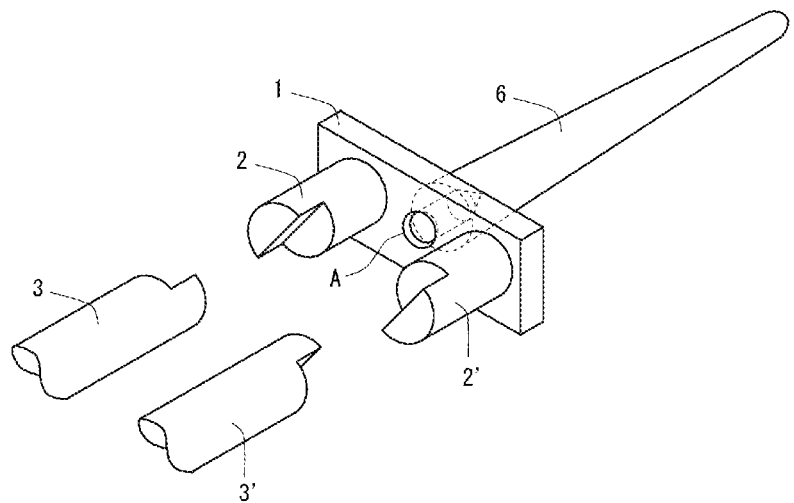
FIG. 1 is a schematic view of a test piece used to evaluate mold release properties in Examples.

The polycarbonate resin composition for an optical component of the present invention exhibits excellent transparency, thermal discoloration resistance and mold release properties, and can therefore be advantageously used in a variety of optical components, and especially thin-walled optical components and the like.

DESCRIPTION OF EMBODIMENTS

The present invention will now be explained in detail through the use of embodiments, examples etc.

The polycarbonate resin composition for an optical component of the present invention is a resin composition comprising 0.1 to 4 parts by mass of a polyalkylene glycol (B) and 0.005 to 0.5 parts by mass of a phosphorus-containing stabilizer (C) relative to 100 parts by mass of a polycarbonate resin (A), wherein the polyalkylene glycol (B) contains 40 to 80 mol % of a tetramethylene glycol unit (b1), 5 to 45 mol % of a (2-methyl)ethylene glycol unit (b2), and 5 to 50 mol % of an ethylene glycol unit (b3), and wherein at least two units selected from the tetramethylene glycol unit (b1), the (2-methyl)ethylene glycol unit (b2), and the ethylene glycol unit (b3) are contained as a copolymer component obtained by copolymerizing them.

[Polycarbonate Resin (A)]

The type of polycarbonate resin used in the present invention is not limited, and it is possible to use a single type or a combination of two or more arbitrary types thereof combined at arbitrary proportions.

A polycarbonate resin is a polymer having a carbonate bond-containing basic structure represented by the formula:
—[—O—X—O—C(=O)—]—.

In the formula, the X moiety generally denotes a hydrocarbon, but it is possible to use X moieties into which heteroatoms or heterobonds are introduced in order to impart a variety of characteristics.

Polycarbonate resins can be classified into aromatic polycarbonate resins, in which a carbon atom directly bonded to a carbonate bond is an aromatic carbon atom, and aliphatic polycarbonate resins, in which a carbon atom directly bonded to a carbonate bond is an aliphatic carbon atom. Of these, aromatic polycarbonate resins are preferred from perspectives such as heat resistance, mechanical properties and electrical properties.

These are not limited to specific types of polycarbonate resin, but examples thereof include polycarbonate polymers obtained by reacting a dihydroxy compound with a carbonate precursor. On such occasion, it is possible to react a polyhydroxy compound or the like in addition to a dihydroxy compound and carbonate precursor. It is also possible to use a method in which a cyclic ether is reacted with carbon dioxide as a carbonate precursor. In addition, the polycarbonate polymer may be a straight chain or branched chain polymer. The polycarbonate polymer may be a homopolymer comprising one type of repeating unit or a copolymer having two or more types of repeating unit. Here, copolymers may be selected from among a variety of copolymer forms, such as random copolymers and block copolymers. Such polycarbonate polymers generally serve as thermoplastic resins.

Among monomers that serve as raw materials for aromatic polycarbonate resins, examples of aromatic dihydroxy compounds include:

dihydroxybenzene compounds such as 1,2-dihydroxybenzene, 1,3-dihydroxybenzene (that is, resorcinol) and 1,4-dihydroxybenzene;

dihydroxybiphenyl compounds such as 2,5-dihydroxybiphenyl, 2,2'-dihydroxybiphenyl and 4,4'-dihydroxybiphenyl;

dihydroxynaphthalene compounds such as 2,2'-dihydroxy-1,1'-binaphthyl, 1,2-dihydroxynaphthalene, 1,3-dihydroxynaphthalene, 2,3-dihydroxynaphthalene, 1,6-dihydroxynaphthalene, 2,6-dihydroxynaphthalene, 1,7-dihydroxynaphthalene and 2,7-dihydroxynaphthalene;

dihydroxydiaryl ether compounds such as 2,2'-dihydroxydiphenyl ether, 3,3'-dihydroxydiphenyl ether, 4,4'-dihydroxydiphenyl ether, 4,4'-dihydroxy-3,3'-dimethyldiphenyl ether, 1,4-bis(3-hydroxyphenoxy)benzene and 1,3-bis(4-hydroxyphenoxy)benzene;

bis(hydroxyaryl)alkane compounds such as 2,2-bis(4-hydroxyphenyl)propane (that is, bisphenol A), 1,1-bis(4-hydroxyphenyl)propane, 2,2-bis(3-methyl-4-hydroxyphenyl)propane, 2,2-bis(3-methoxy-4-hydroxyphenyl)propane, 2-(4-hydroxyphenyl)-2-(3-methoxy-4-hydroxyphenyl)propane, 1,1-bis(3-tert-butyl-4-hydroxyphenyl)propane, 2,2-bis(3,5-dimethyl-4-hydroxyphenyl)propane, 2,2-bis(3-cyclohexyl-4-hydroxyphenyl)propane, 2-(4-hydroxyphenyl)-2-(3-cyclohexyl-4-hydroxyphenyl)propane, α,α'-bis(4-hydroxyphenyl)-1,4-diisopropylbenzene, 1,3-bis[2-(4-hydroxyphenyl)-2-propyl]benzene, bis(4-hydroxyphenyl)methane, bis(4-hydroxyphenyl)cyclohexylmethane, bis(4-hydroxyphenyl)phenylmethane, bis(4-hydroxyphenyl)(4-propenylphenyl)methane, bis(4-hydroxyphenyl)diphenylmethane, bis(4-hydroxyphenyl)naphthylmethane, 1,1-bis(4-hydroxyphenyl)ethane, 1,1-bis(4-hydroxyphenyl)-1-phenylethane, 1,1-bis(4-hydroxyphenyl)-1-naphthylethane, 1,1-bis(4-hydroxyphenyl)butane, 2,2-bis(4-hydroxyphenyl)butane, 2,2-bis(4-hydroxyphenyl)pentane, 1,1-bis(4-hydroxyphenyl)hexane, 2,2-bis(4-hydroxyphenyl)hexane, 1,1-bis(4-hydroxyphenyl)octane, 2,2-bis(4-hydroxyphenyl)octane, 1,1-bis(4-hydroxyphenyl)hexane, 2,2-bis(4-hydroxyphenyl)hexane, 4,4-bis(4-hydroxyphenyl)heptane, 2,2-bis(4-hydroxyphenyl)nonane, 1,1-bis(4-hydroxyphenyl)decane and 1,1-bis(4-hydroxyphenyl)dodecane;

bis(hydroxyaryl)cycloalkane compounds such as 1,1-bis(4-hydroxyphenyl)cyclopentane, 1,1-bis(4-hydroxyphenyl)cyclohexane, 1,1-bis(4-hydroxyphenyl)-3,3-dimethylcyclohexane, 1,1-bis(4-hydroxyphenyl)-3,4-dimethylcyclohexane, 1,1-bis(4-hydroxyphenyl)-3,5-dimethylcyclohexane, 1,1-bis(4-hydroxyphenyl)-3,3,5-trimethylcyclohexane, 1,1-bis(4-hydroxy-3,5-dimethylphenyl)-3,3,5-trimethylcyclohexane, 1,1-bis(4-hydroxyphenyl)-3-propyl-5-methylcyclohexane, 1,1-bis(4-hydroxyphenyl)-3-tert-butylcyclohexane, 1,1-bis(4-hydroxyphenyl)-4-tert-butylcyclohexane, 1,1-bis(4-hydroxyphenyl)-3-phenylcyclohexane and 1,1-bis(4-hydroxyphenyl)-4-phenylcyclohexane;

cardo structure-containing bisphenol compounds such as 9,9-bis(4-hydroxyphenyl)fluorene and 9,9-bis(4-hydroxy-3-methylphenyl)fluorene;

dihydroxydiaryl sulfide compounds such as 4,4'-dihydroxydiphenyl sulfide and 4,4'-dihydroxy-3,3'-dimethyldiphenyl sulfide;

dihydroxydiaryl sulfoxide compounds such as 4,4'-dihydroxydiphenyl sulfoxide and 4,4'-dihydroxy-3,3'-dimethyldiphenyl sulfoxide; and dihydroxydiaryl sulfone compounds such as 4,4'-dihydroxydiphenyl sulfone and 4,4'-dihydroxy-3,3'-dimethyldiphenyl sulfone.

Of these, bis(hydroxyaryl)alkane compounds are preferred, and of these, bis(4-hydroxyphenyl)alkane compounds are preferred and 2,2-bis(4-hydroxyphenyl)propane (that is, bisphenol A) is particularly preferred from the perspectives of impact resistance and heat resistance.

The aromatic dihydroxy compound may be a single type or a combination of two or more arbitrary types thereof combined at arbitrary proportions.

Examples of monomers that serve as raw materials for aliphatic polycarbonate resins include:

alkane diol compounds such as ethane-1,2-diol, propane-1,2-diol, propane-1,3-diol, 2,2-dimethylpropane-1,3-diol, 2-methyl-2-propylpropane-1,3-diol, butane-1,4-diol, pentane-1,5-diol, hexane-1,6-diol and decane-1,10-diol;

cycloalkane diol compounds such as cyclopentane-1,2-diol, cyclohexane-1,2-diol, cyclohexane-1,4-diol, 1,4-cyclohexanedimethanol, 4-(2-hydroxyethyl)cyclohexanol and 2,2,4,4-tetramethyl-cyclobutane-1,3-diol;

glycol compounds such as ethylene glycol, 2,2'-oxydiethanol (that is, diethylene glycol), triethylene glycol, propylene glycol and spiroglycol;

aralkyl diol compounds such as 1,2-benzenedimethanol, 1,3-benzenedimethanol, 1,4-benzenedimethanol, 1,4-benzenediethanol, 1,3-bis(2-hydroxyethoxy)benzene, 1,4-bis(2-hydroxyethoxy)benzene, 2,3-bis(hydroxymethyl)naphthalene, 1,6-bis(hydroxyethoxy)naphthalene, 4,4'-biphenyldimethanol, 4,4'-biphenyldiethanol, 1,4-bis(2-hydroxyethoxy)biphenyl, bisphenol A bis(2-hydroxyethyl) ether and bisphenol S bis(2-hydroxyethyl) ether; and cyclic ether compounds such as 1,2-epoxyethane (that is, ethylene oxide), 1,2-epoxypropane (that is, propylene oxide), 1,2-epoxycyclopentane, 1,2-epoxycyclohexane, 1,4-epoxycyclohexane, 1-methyl-1,2-epoxycyclohexane, 2,3-epoxynorbornane and 1,3-epoxypropane.

Among monomers that serve as raw materials for polycarbonate resins, examples of carbonate precursors include carbonyl halides and carbonate esters.

The carbonate precursor may be a single type or a combination of two or more arbitrary types thereof combined at arbitrary proportions.

Specific examples of carbonyl halides include phosgene; and haloformates such as bischloroformates of dihydroxy compounds and monochloroformates of dihydroxy compounds.

Specific examples of carbonate esters include diaryl carbonate compounds such as diphenyl carbonate and ditolyl carbonate; dialkyl carbonate compounds such as dimethyl carbonate and diethyl carbonate; and carbonates of dihydroxy compounds, such as biscarbonates of dihydroxy compounds, monocarbonates of dihydroxy compounds and cyclic carbonates.

Method for Producing Polycarbonate Resin

The method for producing the polycarbonate resin is not particularly limited, and an arbitrary method can be used. Examples thereof include interfacial polymerization methods, melt transesterification methods, the pyridine process, ring opening polymerization of cyclic carbonate compounds, and solid phase transesterification of prepolymers.

A detailed explanation will now be given of the most suitable of these methods.

Interfacial Polymerization Method

First, an explanation will be given of a case in which the polycarbonate resin is produced using an interfacial polymerization method.

In the interfacial polymerization method, a polycarbonate resin is obtained by reacting a dihydroxy compound with a carbonate precursor (preferably phosgene) in the presence of an organic solvent that is inert in the reaction and an aqueous alkaline solution while maintaining a pH of 9 or higher, and then carrying out interfacial polymerization in the presence of a polymerization catalyst. A molecular weight-adjusting agent (a chain terminator) may, if necessary, be present in the reaction system, and an antioxidant may be present in the reaction system in order to prevent oxidation of the dihydroxy compound.

Dihydroxy compounds and carbonate precursors are as mentioned above.

Among carbonate precursors, phosgene is preferably used, and a method in which phosgene is used is known as the phosgene method.

Examples of organic solvents that are inert in the reaction include chlorinated hydrocarbons such as dichloromethane, 1,2-dichloroethane, chloroform, monochlorobenzene and dichlorobenzene; and aromatic hydrocarbons such as benzene, toluene and xylene.

The organic solvent may be a single type or a combination of two or more arbitrary types thereof combined at arbitrary proportions.

Examples of alkaline compounds contained in the aqueous alkaline solution include alkali metal compounds or alkaline earth metal compounds such as sodium hydroxide, potassium hydroxide, lithium hydroxide and sodium hydrogen carbonate, but of these, sodium hydroxide and potassium hydroxide are preferred. The alkaline compound may be a single type or a combination of two or more arbitrary types thereof combined at arbitrary proportions.

The concentration of the alkaline compound in the aqueous alkaline solution is not limited, but in general, a concentration of 5 to 10 mass % is used in order to control the pH of the aqueous alkaline solution within the range of 10 to 12 during the reaction. In cases where phosgene is blown into the reaction system, it is generally preferable for the molar ratio of the bisphenol compound and the alkaline compound to be 1:1.9 or higher, and especially 1:2.0 or higher, and 1:3.2 or lower, and especially 1:2.5 or lower in order to control the pH of the aqueous phase within the range of 10 to 12, and preferably within the range of 10 to 11.

Examples of the polymerization catalyst include aliphatic tertiary amines such as trimethylamine, triethylamine, tributylamine, tripropylamine and trihexylamine; alicyclic tertiary amines such as N,N'-dimethylcyclohexylamine and N,N'-diethylcyclohexylamine; aromatic tertiary amines such as N,N'-dimethylaniline and N,N'-diethylaniline; quaternary ammonium salts such as trimethylbenzyl ammonium chloride, tetramethyl ammonium chloride and triethylbenzyl ammonium chloride; pyridine; guanidine salts, and the like.

The polymerization catalyst may be a single type or a combination of two or more arbitrary types thereof combined at arbitrary proportions.

Examples of molecular weight-adjusting agents include aromatic phenolic compounds having monohydric phenolic hydroxyl groups; aliphatic alcohols such as methanol and butanol; mercaptans; phthalimide, and the like, but of these, aromatic phenolic compounds are preferred. Specific examples of such aromatic phenolic compounds include alkyl group-substituted phenolic compounds such as m-methylphenol, p-methylphenol, m-propylphenol, p-propylphenol, p-tert-butylphenol and p-long chain alkyl-substituted phenolic compounds; vinyl group-containing phenolic compounds such as isopropenylphenol; epoxy group-containing phenolic compounds; and carboxyl group-containing phenolic compounds such as o-hydroxybenzoic acid and 2-methyl-6-hydroxyphenyl acetic acid.

The molecular weight-adjusting agent may be a single type or a combination of two or more arbitrary types thereof combined at arbitrary proportions.

The usage quantity of the molecular weight-adjusting agent is generally 0.5 moles or higher, and preferably 1 mole or higher, and generally 50 moles or lower, and preferably 30 moles or lower, relative to 100 moles of the dihydroxy compound. By setting the usage quantity of the molecular weight-adjusting agent to fall within this range, it is possible to improve the thermal stability and resistance to hydrolysis of the resin composition.

When carrying out the reaction, the order in which the reactants, reaction medium, catalyst, additives, and the like, are blended is not limited as long as the desired polycarbonate resin can be obtained, and an appropriate order should be set arbitrarily. For example, in cases where phosgene is used as a carbonate precursor, the molecular weight-adjusting agent can be blended at any point between the reaction between the dihydroxy compound and the phosgene (a phosgenation reaction) and the start of the polymerization reaction.

The reaction temperature is generally 0° C. to 40° C., and the reaction time is generally several minutes (for example, 10 minutes) to several hours (for example, 6 hours).

Melt Transesterification Method

An explanation will now be given of a case in which the polycarbonate resin is produced using a melt transesterification method.

In the melt transesterification method, a transesterification reaction is carried out between, for example, a carbonic acid diester and a dihydroxy compound.

Dihydroxy compounds are as mentioned above.

Meanwhile, examples of carbonic acid diesters include dialkyl carbonate compounds such as dimethyl carbonate, diethyl carbonate and di-tert-butyl carbonate; diphenyl carbonate; substituted diphenyl carbonates such as ditolyl carbonate, and the like. Of these, diphenyl carbonate and substituted diphenyl carbonates are preferred, and diphenyl carbonate is more preferred. The carbonic acid diester may be a single type or a combination of two or more arbitrary types thereof combined at arbitrary proportions.

The proportions of the dihydroxy compound and the carbonic acid diester are not limited as long as the desired polycarbonate resin can be obtained, but it is preferable to use the carbonic acid diester at an equimolar quantity or higher relative to 1 mole of the dihydroxy compound, and especially at a quantity of 1.01 moles or more relative to 1 mole of the dihydroxy compound. The upper limit of this proportion is generally 1.30 moles or lower. By setting these proportions to fall within this range, the quantity of terminal hydroxyl groups can be adjusted within an appropriate range.

In polycarbonate resins, the quantity of terminal hydroxyl groups tends to have a major effect on thermal stability, resistance to hydrolysis, color tone, and the like. Therefore, the quantity of terminal hydroxyl groups may be adjusted if necessary using any publicly known method. In transesterification reactions, it is generally possible to obtain a polycarbonate resin having the desired quantity of terminal hydroxyl groups by, for example, adjusting the blending proportions of the carbonic acid diester and the aromatic dihydroxy compound or by adjusting the degree of pressure reduction during the transesterification reaction. By carrying out such operations, it is generally possible to adjust the molecular weight of the obtained polycarbonate resin.

In cases where the quantity of terminal hydroxyl groups is adjusted by adjusting the blending proportions of the carbonic acid diester and the dihydroxy compound, the blending proportions should be as mentioned above.

An example of a more proactive adjustment method is a method in which a chain terminator is separately blended during the reaction. In such cases, examples of chain terminators able to be used include monohydric phenolic compounds, monohydric carboxylic acids and carbonic acid diesters. The chain terminator may be a single type or a combination of two or more arbitrary types thereof combined at arbitrary proportions.

When producing a polycarbonate resin by a melt transesterification method, a transesterification catalyst is generally used. Any transesterification catalyst can be used. Of these, the use of, for example, an alkali metal compound and/or an alkaline earth metal compound is preferred. It is possible to supplementally use a basic compound such as a basic boron compound, a basic phosphorus compound, a basic ammonium compound or an amine compound. The transesterification catalyst may be a single type or a combination of two or more arbitrary types thereof combined at arbitrary proportions.

In melt transesterification methods, the reaction temperature is generally 100° C. to 320° C. The pressure during the reaction is generally a reduced pressure of 2 mm Hg or lower. A specific procedure is to carry out a melt polycondensation reaction under the temperature and pressure ranges mentioned above while removing by-products such as aromatic hydroxy compounds.

The melt polycondensation reaction can be carried out using a batch type method or a continuous method. When carrying out a batch type reaction, the order in which the reactants, reaction medium, catalyst, additives, and the like are blended is not limited as long as the desired aromatic polycarbonate resin can be obtained, and an appropriate order should be set arbitrarily. Of these, however, it is preferable for the melt polycondensation reaction to be carried out using a continuous process from perspectives such as stability of the polycarbonate resin.

In the melt transesterification method, a catalyst deactivator may be used if necessary. Any compound that neutralizes the transesterification catalyst can be used as a catalyst deactivator. Examples thereof include sulfur-containing acidic compounds and derivatives thereof. The catalyst deactivator may be a single type or a combination of two or more arbitrary types thereof combined at arbitrary proportions.

The usage quantity of the catalyst deactivator is generally 0.5 equivalents or higher, and preferably 1 equivalent or higher, and generally 10 equivalents or lower, and preferably 5 equivalents or lower, relative to the alkali metal or alkaline earth metal contained in the transesterification catalyst. The usage quantity of the catalyst deactivator is generally 1 ppm or higher and generally 100 ppm or lower, and preferably 20 ppm or lower, relative to the polycarbonate resin.

The molecular weight of the polycarbonate resin (A) is such that the viscosity average molecular weight (Mv), as calculated from solution viscosity measured at a temperature of 25° C. using methylene chloride as a solvent, is preferably 10,000 to 15,000, more preferably 10,500 or more, further preferably 11,000 or more, particularly preferably 11,500 or more, and most preferably 12,000 or more, and is more preferably 14,500 or less. By setting the viscosity average molecular weight to be not lower than the lower limit of the range mentioned above, it is possible to further increase the mechanical strength of the polycarbonate resin composition for an optical component of the present invention, and by setting this viscosity average molecular weight to be not higher than the upper limit of the range mentioned above, it is possible to better suppress a decrease in fluidity of the polycarbonate resin composition for an optical component of the present invention, increase molding processing properties, and facilitate thin wall molding.

Moreover, it is possible to use a mixture of two or more types of polycarbonate resin having different viscosity average molecular weights, and in such cases, it is possible to mix polycarbonate resins whose viscosity average molecular weights fall outside the preferred range mentioned above.

The viscosity average molecular weight [Mv] is a value obtained by determining the intrinsic viscosity [η] (units: dl/g) at 25° C. using a Ubbelohde type viscometer using methylene chloride as a solvent, and then calculating the viscosity average molecular weight from the Schnell viscosity equation, that is, $\eta = 1.23 \times 10^{-4}$ $Mv^{0.83}$. The intrinsic viscosity [η] is a value obtained by measuring the specific viscosity [$\eta_{sp}$] at a number of solution concentrations [C] (g/dl) and calculating the intrinsic viscosity from the following formula.

$$\eta = \lim_{c \to 0} \eta_{sp}/c \quad \text{[Math. 1]}$$

The terminal hydroxyl group concentration in the polycarbonate resin is arbitrary and should be selected and decided as appropriate, but is generally 1000 ppm or less, preferably 800 ppm or less, and more preferably 600 ppm or less. Due to this configuration, it is possible to further improve the residual thermal stability and color tone of the polycarbonate resin. The lower limit thereof is generally 10 ppm or more, preferably 30 ppm or more, and more preferably 40 ppm or more, for a polycarbonate resin produced using a melt transesterification method in particular. Due to this configuration, it is possible to suppress a decrease in molecular weight and further improve the mechanical characteristics of the resin composition.

Units for terminal hydroxyl group concentration are such that the mass of terminal hydroxyl groups is expressed in terms of ppm relative to the mass of the polycarbonate resin. This measurement method is a colorimetric method involving use of a titanium tetrachloride/acetic acid method (this is described in Macromol. Chem. 88 215 (1965)).

The polycarbonate resin may be a single polycarbonate resin (a single polycarbonate resin is not limited to modes which contain only one type of polycarbonate resin, and can include, for example, modes that contain a plurality of polycarbonate resins having different monomer compositions or molecular weights), but may also be an alloy (mixture) of a polycarbonate resin and another thermoplastic resin. Furthermore, the polycarbonate resin may be constituted as the main component in a copolymer, for example, the polycarbonate resin may be constituted as a copolymer with an oligomer or polymer having a siloxane structure in order to, for example, further increase flame retardancy and impact resistance; the polycarbonate resin may be constituted as a copolymer with a monomer, oligomer or polymer having a phosphorus atom in order to further improve thermal oxidation stability and flame retardancy; the polycarbonate resin may be constituted as a copolymer with a monomer, oligomer or polymer having a dihydroxyanthraquinone structure in order to improve thermal oxidation stability; the polycarbonate resin may be constituted as a copolymer with an oligomer or polymer having an olefinic structure, such as polystyrene, in order to improve optical properties; and the polycarbonate resin may be constituted as a copolymer with a polyester resin oligomer or polymer in order to improve chemical resistance.

In order to improve the appearance of a molded article or improve the fluidity, the polycarbonate resin may contain a polycarbonate oligomer. The viscosity average molecular weight [Mv] of this polycarbonate oligomer is generally 1500 or higher, and preferably 2000 or higher, and is generally 9500 or lower, and preferably 9000 or lower. Furthermore, it is preferable for the contained polycarbonate oligomer to account for 30 mass % or less of the polycarbonate resin (including the polycarbonate oligomer).

The polycarbonate resin may use not only virgin raw materials, but also polycarbonate resins regenerated from used products (so-called material-recycled polycarbonate resins).

However, it is preferable for regenerated polycarbonate resins to account for 80 mass % or less, and more preferably 50 mass % or less, of the polycarbonate resin. Because regenerated polycarbonate resins are highly likely to have undergone deterioration such as thermal deterioration or age-related deterioration, in cases where such polycarbonate resins are used at quantities in excess of the range mentioned above, it is possible that the hue or mechanical properties will deteriorate.

[Polyalkylene Glycol (B)]

The polycarbonate resin composition for an optical component of the present invention contains tetramethylene glycol units (b1), (2-methyl)ethylene glycol units (b2) and ethylene glycol units (b3) as the polyalkylene glycol (B).

In the present specification, these units mean alkylene ether units, such as tetramethylene ether units, (2-methyl) ethylene ether units, and ethylene ether units, which are derived from tetramethylene glycol, (2-methyl)ethylene glycol, ethylene glycol, and the like. Terminal groups in the polyalkylene glycol may be hydroxyl groups bonded to these units or substituent groups such as those mentioned below.

In addition, in cases where the polyalkylene glycol (A) is a mixture of polyalkylene glycols, this means constituent units of the respective polyalkylene glycols, and in cases where the polyalkylene glycol (A) is a copolymer, this means constituent units of the copolymer.

In addition, the polyalkylene glycol (B) is characterized in that the above-described (b1), (b2), and (b3), which are contained in the polyalkylene glycol (B), are contained as a copolymer obtained by copolymerizing at least two units selected from the above-described (b1), (b2), and (b3). That is, the polyalkylene glycol (B) is characterized by being contained as:

(i) a copolymer having tetramethylene glycol units (b1) and (2-methyl)ethylene glycol units (b2);

(ii) a copolymer having tetramethylene glycol units (b1) and ethylene glycol units (b3);

(iii) a copolymer having (2-methyl)ethylene glycol units (b2) and ethylene glycol units (b3); or (iv) a copolymer having tetramethylene glycol units (b1), (2-methyl)ethylene glycol units (b2), and ethylene glycol units (b3).

In the case of (i) to (iii) above, the other remaining alkylene glycol units may be a homopolymer of these units, a copolymer with other remaining units, or a copolymer with units other than (b1) to (b3).

Methods for producing polyalkylene glycols (B) represented by (i) to (iii) above are well known, and such polyalkylene glycols (B) can be produced by copolymerizing a glycol, an alkylene oxide or polyether-forming derivative thereof, such as those mentioned above, generally using an acid catalyst. Specific methods include methods disclosed in, for example, JP S61-123628 A and JP H07-224291 A.

Preferred examples of units other than (b1) to (b3) include (2-ethyl)ethylene glycol, (2,2'-dimethyl)propylene glycol and (3-methyl)tetramethylene glycol.

In the present invention, the amount of tetramethylene glycol units (b1) in the polyalkylene glycol (B) is 40 to 80 mol %, the amount of (2-methyl)ethylene glycol units (b2) is 5 to 45 mol %, and the amount of ethylene glycol units (b3) is 5 to 50 mol %, each relative to a total of 100 mol % of units (b1) to (b3). The proportions of units (b1) to (b3) are preferably 45 to 75 mol %, and more preferably 50 to 70 mol %, of units (b1), preferably 6 to 40 mol %, and more preferably 7 to 35 mol %, of units (b2), and preferably 8 to 45 mol %, and more preferably 10 to 43 mol %, of units (b3).

The amount of units other than (b1) to (b3) is preferably 1 to 10 mol %, more preferably 1 to 5 mol %, and further preferably 1 to 3 mol %, relative to the total amount (100 mol %) of the polyalkylene glycol (B).

The molar proportions of units (b1) to (b3) in the polyalkylene glycol (B) are measured with a $^1$H-NMR measurement apparatus using deuterated chloroform as a solvent.

The polyalkylene (co)polymers that constitute the polyalkylene glycol (B) are preferably such that terminal groups are hydroxyl groups. In addition, even derivatives in which one terminal or both terminals are capped with an alkyl ether, an aryl ether, an aralkyl ether, a fatty acid ester, an aryl ester or the like, is used, this has no effect on performance, and etherified products and esterified products can also be used.

Alkyl groups that constitute alkyl ethers can be straight chain or branched chain, and are preferably alkyl groups having 1 to 22 carbon atoms, such as methyl groups, ethyl groups, propyl groups, butyl groups, octyl groups, lauryl groups, stearyl groups, and the like, or are methyl ethers, ethyl ethers, butyl ethers, lauryl ethers, stearyl ethers, and the like, of polyalkylene glycols.

Aryl groups that constitute aryl ethers are preferably aryl groups having 6 to 22 carbon atoms, more preferably 6 to 12 carbon atoms, and further preferably 6 to 10 carbon atoms, such as phenyl groups, tolyl groups and naphthyl groups, with phenyl groups and tolyl groups being preferred. Aralkyl groups are preferably aralkyl groups having 7 to 23 carbon atoms, more preferably 7 to 13 carbon atoms, and further preferably 7 to 11 carbon atoms, such as benzyl groups and phenethyl groups, with benzyl groups being particularly preferred.

Fatty acids that constitute fatty acid esters can be straight chain or branched chain, and may be saturated fatty acids or unsaturated fatty acids.

Fatty acids that constitute fatty acid esters are monovalent or divalent fatty acids having 1 to 22 carbon atoms, for example monovalent saturated fatty acids such as formic acid, acetic acid, propionic acid, butyric acid, valeric acid, caproic acid, enanthic acid, caprylic acid, capric acid, lauric acid, myristic acid, pentadecylic acid, palmitic acid, heptadecylic acid, stearic acid, nonadecanoic acid, arachidic acid and behenic acid; and unsaturated fatty acids, such as oleic acid, elaidic acid, linolic acid, linolenic acid and arachidonic acid; and divalent fatty acids having 10 or more carbon atoms, such as sebacic acid, undecanedioic acid, dodecanedioic acid, tetradecanedioic acid, thapsia acid, decenedioic acid, undecenedioic acid and dodecenedioic acid.

Aryl groups that constitute aryl esters are preferably aryl groups having 6 to 22 carbon atoms, more preferably 6 to 12 carbon atoms, and further preferably 6 to 10 carbon atoms, such as phenyl groups, tolyl groups and naphthyl groups, with phenyl groups and tolyl groups being preferred. Because a polycarbonate exhibits good compatibility even if a group that caps a terminal is an aralkyl group, aralkyl groups can exhibit a similar effect to aryl groups, and aralkyl groups are preferably aralkyl groups having 7 to 23 carbon atoms, more preferably 7 to 13 carbon atoms, and further preferably 7 to 11 carbon atoms, examples of which include benzyl groups and phenethyl groups, with benzyl groups being particularly preferred.

The polyalkylene glycol (B) may contain structures derived from polyols such as 1,4-butane diol, glycerol, sorbitol, benzene diol, bisphenol A, cyclohexane diol and spiroglycol in the structure. By adding these polyols during polymerization of the polyalkylene glycol, organic groups in these polyols can be supplied to the main chain. Particularly preferred examples include glycerol, sorbitol and bisphenol A.

Preferred examples of polyalkylene glycols having organic groups in the structure thereof include polyethylene glycol glyceryl ether, poly(2-methyl)ethylene glycol glyceryl ether, poly(2-ethyl)ethylene glycol glyceryl ether, polytetramethylene glycol glyceryl ether, polyethylene glycol-poly(2-methyl)ethylene glycol glyceryl ether, polytetramethylene glycol-poly(2-methyl)ethylene glycol glyceryl ether, polytetramethylene glycol-poly(2-ethyl) polyethylene glycol glyceryl ether, polyethylene glycol sorbityl ether, poly(2-methyl)ethylene glycol sorbityl ether, poly(2-ethyl)ethylene glycol sorbityl ether, polytetramethylene glycol sorbityl ether, polyethylene glycol-poly(2-methyl)ethylene glycol sorbityl ether, polytetramethylene glycol-poly(2-methyl)ethylene glycol sorbityl ether, polytetramethylene glycol-poly(2-ethyl)ethylene glycol sorbityl ether, bisphenol A-bis(polyethylene glycol) ether, bisphenol A-bis(poly(2-methyl)ethylene glycol) ether, bisphenol A-bis(poly(2-ethyl)ethylene glycol) ether, bisphenol A-bis(polytetramethylene glycol) ether, bisphenol A-bis(polyethylene glycol-poly(2-methyl)ethylene glycol) ether, bisphenol A-bis(polytetramethylene glycol-poly(2-methyl)ethylene glycol) ether and bisphenol A-bis(polytetramethylene glycol-poly(2-ethyl)polyethylene glycol) ether.

The number average molecular weight of the polyalkylene glycol (B) is preferably more than 1,200 and less than 5,000, more preferably more than 1300, further preferably more than 1400, more preferably less than 4,500, further preferably less than 4,000, particularly preferably 3,500 or less, and most preferably 3,000 or less. If the number average molecular weight exceeds the range mentioned above, compatibility decreases, which is not desirable, and if the number average molecular weight is lower than the range mentioned above, gas is generated during molding, which is not desirable.

In the present specification, the number average molecular weight of the polyalkylene glycol (B) is defined as a value calculated on the basis of the hydroxyl value measured in accordance with JIS K1577.

The content of the polyalkylene glycol (B) is preferably 0.1 to 4 parts by mass relative to 100 parts by mass of a polycarbonate resin (A). If the content of the polyalkylene glycol (B) is less than 0.1 parts by mass, mold release properties during molding deteriorate, and if this content exceeds 4 parts by mass, light transmittance decreases as a result of whitening of the polycarbonate resin. The content of the polyalkylene glycol (B) is preferably 0.15 parts by mass or more, more preferably 0.2 parts by mass or more, preferably 3.5 parts by mass or less, more preferably 3.0 parts by mass or less, and particularly preferably 2.5 parts by mass or less.

[Phosphorus-Containing Stabilizer (C)]

The polycarbonate resin composition for an optical component of the present invention preferably contains a phosphorus-containing stabilizer. By incorporating a phosphorus-containing stabilizer, the color hue of the polycarbonate resin composition for an optical component of the present invention is improved, and thermal discoloration resistance is further improved.

Any publicly known phosphorus-containing stabilizer can be used as the phosphorus-containing stabilizer. Specific examples thereof include oxoacids of phosphorus, such as phosphoric acid, phosphonic acid, phosphorous acid, phosphinic acid and polyphosphoric acid; acidic metal pyrophosphate salts, such as acidic sodium pyrophosphate, acidic potassium pyrophosphate and acidic calcium pyrophosphate; phosphate salts of group 1 or group 2B metals, such as potassium phosphate, sodium phosphate, cesium phosphate and zinc phosphate; phosphate compounds, phosphite compounds and phosphonite compounds, but phosphite compounds are particularly preferred. By selecting a phosphite compound, it is possible to obtain a polycarbonate resin composition for an optical component, which has higher discoloration resistance and suitability for continuous production.

Here, the phosphite compound is a trivalent phosphorus compound represented by the general formula $P(OR)_3$, and R denotes a monovalent or divalent organic group.

Examples of such phosphite compounds include triphenyl phosphite, tris(monononylphenyl) phosphite, tris(mononyl/dinonylphenyl) phosphite, tris(2,4-di-tert-butylphenyl) phosphite, monooctyldiphenyl phosphite, dioctylmonophenyl phosphite, monodecyldiphenyl phosphite, didecylmonophenyl phosphite, tridecyl phosphite, trilauryl phosphite, tristearyl phosphite, distearylpentaerythritol diphosphite, bis(2,4-di-tert-butyl-4-methylphenyl)pentaerythritol phosphite, bis(2,6-di-tert-butylphenyl)octyl phosphite, 2,2-methylenebis(4,6-di-tert-butylphenyl)octyl phosphite, tetrakis(2,4-di-tert-butylphenyl)-4,4'-biphenylene-diphosphite and 6-[3-(3-tert-butyl-hydroxy-5-methylphenyl)propoxy]-2,4,8,10-tetra-tert-butyldibenzo[d,f] [1,3,2]-dioxaphosphepin.

Among such phosphite compounds, aromatic phosphite compounds represented by formula (1) and formula (2) are more preferred from the perspective of effectively increasing thermal discoloration resistance of the polycarbonate resin composition for an optical component of the present invention.

[C1]

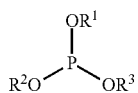

(1)

In formula (1), $R^1$, $R^2$ and $R^3$ may be the same as, or different from, each other, and each denote an aryl group having 6 to 30 carbon atoms.

[C2]

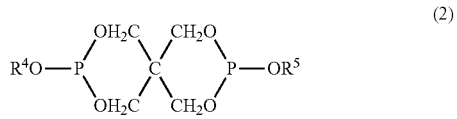

(2)

In formula (2), $R^4$ and $R^5$ may be the same as, or different from, each other, and each denote an aryl group having 6 to 30 carbon atoms.

Among phosphite compounds represented by formula (1) above, triphenyl phosphite, tris(monononylphenyl) phosphite, tris(2,4-di-tert-butylphenyl) phosphite, and the like, are preferred, and of these, tris(2,4-di-tert-butylphenyl) phosphite is more preferred. Specific examples of such organic phosphite compounds include "ADK STAB 1178" from ADEKA Corporation, "Sumilizer TNP" from Sumitomo Chemical Co., "JP-351" from Johoku Chemical Co., "ADK STAB 2112" from ADEKA Corporation, "Irgafos 168" from BASF, and "JP-650" from Johoku Chemical Co.

Particularly preferred examples of phosphite compounds represented by formula (2) include compounds having a pentaerythritol diphosphite structure, such as bis(2,4-di-tert-butyl-4-methylphenyl)pentaerythritol diphosphite, bis(2,6-di-tert-butyl-4-methylphenyl)pentaerythritol diphosphite and bis(2,4-dicumylphenyl)pentaerythritol diphosphite. Specific preferred examples of such organic phosphite compounds include "ADK STAB PEP-24G" and "ADK STAB PEP-36" from ADEKA Corporation and "Doverphos S-9228" from Dover Chemical Corporation.

Among phosphite compounds, aromatic phosphite compounds represented by formula (2) above are more preferred from the perspective of superior color hue.

It is possible to incorporate one phosphorus-containing stabilizer or an arbitrary combination of two or more types thereof combined at arbitrary proportions.

The content of the phosphorus-containing stabilizer (C) is, relative to 100 parts by mass of the polycarbonate resin (A), preferably 0.005 to 0.5 parts by mass, more preferably 0.007 parts by mass or more, further preferably 0.008 parts by mass or more, and particularly preferably 0.01 parts by mass or more, and is more preferably 0.4 parts by mass or less, further preferably 0.3 parts by mass or less, such as 0.2 parts by mass or less, and particularly preferably 0.1 parts by mass or less. If the content of the phosphorus-containing stabilizer (C) is less than 0.005 parts by mass, color hue and thermal discoloration resistance tend to be inadequate, and if the content of the phosphorus-containing stabilizer (C) exceeds 0.5 parts by mass, thermal discoloration resistance tends to deteriorate and wet heat stability also tends to deteriorate.

[Epoxy Compound (D)]

It is preferable for the resin composition of the present invention to further contain an epoxy compound (D). By incorporating the epoxy compound (D) together with the polyalkylene glycol polymer (B), it is possible to further improve thermal discoloration resistance.

A compound having one or more epoxy group per molecule can be used as the epoxy compound (D). Specifically, phenyl glycidyl ether, allyl glycidyl ether, t-butylphenyl glycidyl ether, 3,4-epoxycyclohexylmethyl-3',4'-epoxycyclohexyl carboxylate, 3,4-epoxy-6-methylcyclohexylmethyl-3',4'-epoxy-6'-methylcyclohexyl carboxylate, 2,3-epoxycyclohexylmethyl-3',4'-epoxycyclohexyl carboxylate, 4-(3,4-epoxy-5-methylcyclohexyl)butyl-3',4'-epoxycyclohexyl carboxylate, 3,4-epoxycyclohexylethylene oxide, cyclohexylmethyl-3,4-epoxycyclohexyl carboxylate, 3,4-epoxy-6-methylcyclohexylmethyl-6'-methylcyclohexyl carboxylate, bisphenol-A diglycidyl ether, tetrabromobisphenol-A glycidyl ether, phthalic acid diglycidyl ester, hexahydrophthalic acid diglycidyl ester, bis-epoxydicyclopentadienyl ether, bis-epoxyethylene glycol, bis-epoxycyclohexyl adipate, butadiene diepoxide, tetraphenylethylene epoxide, octyl epoxy tallate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl-2,2-dimethyl-3,4-epoxycyclohexyl carboxylate, N-butyl-2,2-dimethyl-3,4-epoxycyclohexyl carboxylate, cyclohexyl-2-methyl-3,4-epoxycyclohexyl carboxylate, N-butyl-2-isopropyl-3,4-epoxy-5-methylcyclohexyl carboxylate, octadecyl-3,4-epoxycyclohexyl carboxylate, 2-ethylhexyl-3',4'-epoxycyclohexyl carboxylate, 4,6-dimethyl-2,3-epoxycyclohexyl-3',4'-epoxycyclohexyl carboxylate, 4,5-epoxytetrahydrophthalic acid anhydride, 3-t-butyl-4,5-epoxytetrahydrophthalic acid anhydride, diethyl-4,5-epoxy-cis-1,2-cyclohexyl dicarboxylate, di-n-butyl-3-t-butyl-4,5-epoxy-cis-1,2-cyclohexyl dicarboxylate, epoxidized soy bean oil, epoxidized linseed oil, and the like, can be advantageously used.

It is possible to use one of these epoxy compounds in isolation, or a combination of two or more types thereof.

Of these, alicyclic epoxy compounds can be advantageously used, and 3,4-epoxycyclohexylmethyl-3',4'-epoxycyclohexyl carboxylate is particularly preferred.

The content of the epoxy compound (D) is, relative to 100 parts by mass of the polycarbonate resin (A), preferably 0.0005 to 0.2 parts by mass, more preferably 0.001 parts by mass or more, further preferably 0.003 parts by mass or more, and particularly preferably 0.005 parts by mass or more, and is more preferably 0.15 parts by mass or less, further preferably 0.1 parts by mass or less, and particularly preferably 0.05 parts by mass or less. If the content of the epoxy compound (D) is less than 0.0005 parts by mass, color hue and thermal discoloration resistance tend to be inadequate, and if the content of the epoxy compound (D) exceeds 0.2 parts by mass, thermal discoloration resistance tends to deteriorate and color hue and wet heat stability also tend to deteriorate.

[Additives and the Like]

In addition, the polycarbonate resin composition for an optical component of the present invention may contain additives in addition to those mentioned above, such as antioxidants, mold release agents, ultraviolet radiation absorbers, fluorescent brightening agents, pigments, dyes, polymers other than polycarbonate resins, flame retardants, impact resistance-improving agents, anti-static agents, plasticizers and compatibilizers. It is possible to use one of these additives or a mixture of two or more types thereof.

In cases where a resin other than a polycarbonate resin is contained, the content thereof is preferably 20 parts by mass or less, more preferably 10 parts by mass or less, further preferably 5 parts by mass or less, and particularly preferably 3 parts by mass or less, relative to 100 parts by mass of the polycarbonate resin component (A).

[Method for Producing Polycarbonate Resin Composition for Optical Component]

The method for producing the polycarbonate resin composition for an optical component of the present invention is not limited, and publicly known methods for producing polycarbonate resin compositions for optical components can be widely used, an example of which is a method consisting of preliminarily mixing the polycarbonate resin (A), the (co)polymer of the polyalkylene glycol (B), the phosphorus-containing stabilizer (C) and other components to be blended as required in any of a variety of mixing machines, such as a tumbler or Henschel mixer, and then melt kneading using a mixer such as a Banbury mixer, a roller, a Brabender, a uniaxial kneading extruder, a biaxial kneading extruder, or a kneader. The temperature during the melt kneading is not particularly limited, but is generally within the range of 240° C. to 320° C.

The polycarbonate resin composition for an optical component of the present invention exhibits high spectral transmittance, and can exhibit high spectral transmittance whereby the spectral transmittance at a wavelength of 420 nm is preferably 50% or more, as measured at a light path length of 300 mm. Spectral transmittance at a wavelength of 420 nm is spectral transmittance at a wavelength region similar to the wavelength region of blue LEDs that are widely used in optical components such as light guide plates, and if the spectral transmittance in this wavelength region is low, yellowness increases.

Spectral transmittance at a wavelength of 420 nm is measured at a light path length of 300 mm using an injection molded article having a long light path length (measuring 300 mm×7 mm×4 mm).

[Optical Component]

A polycarbonate resin composition for an optical component of the present invention can be produced by molding pellets, which are obtained by pelletizing the polycarbonate resin composition for an optical component, using a variety of molding methods. It is also possible to obtain an optical component by directly molding the resin composition that has been melt kneaded in an extruder, without forming pellets.

The polycarbonate resin composition for an optical component of the present invention exhibits excellent fluidity and mold release properties, and also exhibits excellent transparency and thermal discoloration resistance, and can therefore achieve excellent molded article appearance without white spot defects and achieve a balance between transmittance and color hue even if molded into a thin-walled molded article, and can therefore be advantageously used to mold thin-walled optical components by means of injection molding. In general, the resin temperature during injection molding is preferably higher than 260° C. to 300° C., which is a temperature used for injection molding polycarbonate resins, and a resin temperature of 305° C. to 380° C. is preferred. The resin temperature is more preferably 310° C. or higher, further preferably 315° C. or higher, and particularly preferably 320° C. or higher, and is more preferably 370° C. or lower. In cases where conventional polycarbonate resin compositions for optical components were used, if the resin temperature during molding was increased in order to form a thin-walled molded article, problems occurred, such as white spot defects appearing on the surface of a molded article, but by using the resin composition of the present invention, it is now possible to produce a thin-walled molded article having a good appearance within the temperature range mentioned above.

The resin temperature can be taken to be the preset barrel temperature in cases where direct measurement is difficult.

Here, thin-walled molded article generally means a molded article having a sheet-like part having a thickness of 1 mm or less, preferably 0.8 mm or less, and further preferably 0.6 mm or less. Here, the sheet-like part may be flat or curved and, even in the case of a flat surface, may have surface unevenness, and a cross section may have a slanted surface or a wedge-shaped cross section.

Examples of optical components include components of equipment/instruments that directly or indirectly use light sources, such as LEDs, organic EL elements, light bulbs, fluorescent lamps and cathode ray tubes, and light guide plates and members for surface light-emitting bodies are typical examples.

Light guide plates are used for guiding light from light sources such as LEDs in liquid crystal backlight units, a variety of display devices and lighting systems, and uniformly diffuse light from a side surface or back surface by means of protrusions and recesses provided on a surface of the light guide plate, thereby emitting light evenly. Light guide plates are generally planar, and may have or may not have protrusions and recesses on a surface thereof.

In general, light guide plates are preferably formed by means of injection molding, ultra high-speed injection molding, injection compression molding, or the like.

A light guide plate formed using the resin composition of the present invention exhibits extremely good transmittance and color hue without causing white turbidness or a decrease in transmittance.

A light guide plate formed using the polycarbonate resin composition for an optical component of the present invention can be advantageously used in liquid crystal back light units, a variety of display devices and lighting systems. Examples of such devices include a variety of handheld terminals, such as mobile telephones, mobile notebooks, netbooks, slate PCs, tablet PCs, smartphones and tablets, cameras, watches, laptops, a variety of displays and lighting systems.

EXAMPLES

The present invention will now be explained in greater detail through the use of Examples. However, it should be understood that the present invention is not limited to the Examples given below.

The raw materials and evaluation methods used in the Examples and Comparative Examples given below are as follows. The method for measuring the viscosity average molecular weight of the polycarbonate resin (A) is as described above.

TABLE 1

| Component | Code | |
|---|---|---|
| Poly-carbonate resin (A) | A1 | Aromatic polycarbonate resin obtained by interfacial polymerization using Bisphenol A as a starting material Product name "H-7000F" from Mitsubishi Engineering-Plastics Corporation Mv: 14,000 |
| | A2 | Aromatic polycarbonate resin obtained by interfacial polymerization using Bisphenol A as a starting material Product name "L-1000F" from Mitsubishi Engineering-Plastics Corporation Mv: 11,000 |
| Poly-alkylene glycol (B) | B1 | Polyalkylene glycol copolymer represented by HO—$(CH_2CH_2CH_2CH_2O)_m$—/—$(CH_2CH_2O)_n$—H Product name "Polycerin DC-1800E" from NOF Corporation Number average molecular weight: 1800 m/n molar ratio: 45.1/54.9 |
| | B2 | Polyalkylene glycol copolymer represented by HO—$(CH_2CH_2CH_2CH_2O)_m$—/—$(CH_2(CH_3)CH_2O)_n$—H Product name "Polycerin DCB-2000" available from NOF Corporation Number average molecular weight: 2000 m/n molar ratio: 61.7/38.3 |
| | B3 | Polyalkylene glycol copolymer represented by HO—$(CH_2CH_2CH_2CH_2O)_m$—/—$(CH(CH_3)CH_2O)_n$—/—$(CH_2CH_2O)_l$—H Number average molecular weight: 2000 m/n/l molar ratio: 56.3/20.3/23.4 |
| | B4 | Polyalkylene glycol copolymer represented by HO—$(CH_2CH_2CH_2CH_2O)_m$—/—$(CH(CH_3)CH_2O)_n$—/—$(CH_2CH_2O)_l$—H Number average molecular weight: 2000 m/n/l molar ratio: 58.1/30.1/11.8 |
| Poly-alkylene glycol (X) | X1 | Polytetramethylene glycol represented by HO—$(CH_2CH_2CH_2CH_2O)_m$—H Product name "PTMG1000" from Mitsubishi Chemical Corporation Number average molecular weight: 1000 |
| | X2 | Poly(2-methyl)ethylene glycol represented by HO—$(CH(CH_3)CH_2O)_n$—H Product name "Uniol D-1000" from NOF Corporation Number average molecular weight: 1000 |
| | X3 | Polyethylene glycol represented by HO—$(CH_2CH_2O)_m$—H from Sigma-Aldrich Co. Number average molecular weight: 1000 |
| Phosphorus-containing stabilizer (C) | C1 | bis(2,6-di-tert-butyl-4-methylphenyl)pentaerythritol diphosphite Product name "ADK STAB PEP-36" from ADEKA Corporation |

Examples 1 to 6 and Comparative Examples 1 to 3

[Production of Resin Composition Pellets]

Polycarbonate resin composition pellets were obtained by blending the components listed above at the proportions (parts by mass) shown in Table 2 below, mixing for 20 minutes in a tumbler, melt kneading at a cylinder temperature of 240° C. using a vented single screw extruder having a screw diameter of 40 mm ("VS-40" from Tanabe Plastics Machinery Co.), and then cutting strands.

In the polycarbonate resin compositions, the proportions (mol %) of tetramethylene glycol units (b1), (2-methyl) ethylene glycol units (b2), and ethylene glycol units (b3) relative to the total amount (100 mol %) of the blended polyalkylene glycol (B) are shown in Table 2.

[Color Hue (YI)]

A molded article having a long light path length (measuring 300 mm×7 mm×4 mm) was formed by drying the obtained pellets for 5 hours at 120° C. using a hot air circulation type dryer and then injection molding using an injection molding machine ("EC100SX-2A" from Toshiba Machine Co.) at a resin temperature of 340° C. and a mold temperature of 80° C.

The YI (yellowness index) of this molded article having a long light path length was measured at a light path length of 300 mm. Measurements were carried out using a long light path length spectrophotometric type transmission color meter ("ASA 1" from Nippon Denshoku Industries Co., C light source, 2° field of view).

[Evaluation of ΔYI: Thermal Discoloration Resistance]

YI was measured after holding the molded article having a long light path length at 95° C. for 700 hours, the difference in YI values (ΔYI) was determined, and thermal discoloration resistance was evaluated. A lower ΔYI value means better thermal discoloration resistance.

[Evaluation of Mold Release Properties: Shortest Time for Mold Release]

The obtained pellets were dried for 5 hours at 120° C. using a hot air circulation type dryer and then molded into an approximately T-shaped test piece shown in FIG. 1 using an injection molding machine ("HSP100A" from Sodick Co.) at a barrel temperature of 360° C., a mold temperature of 80° C., an injection speed of 500 mm/sec, a holding pressure of 1.0 MPa, and a holding pressure time of 2 sec, and the state of the test piece when released by means of ejector pins was evaluated using the method described below.

FIG. 1 is a conceptual diagram that shows the shape of a test piece and a test method in which the test piece is released from a mold by means of ejector pins. The test piece 1 is approximately T-shaped, and is pushed and released from a movable side mold 5 by ejector pins 3 and 3' at parts 2 and 2' of the test piece 1.

Figure 2:
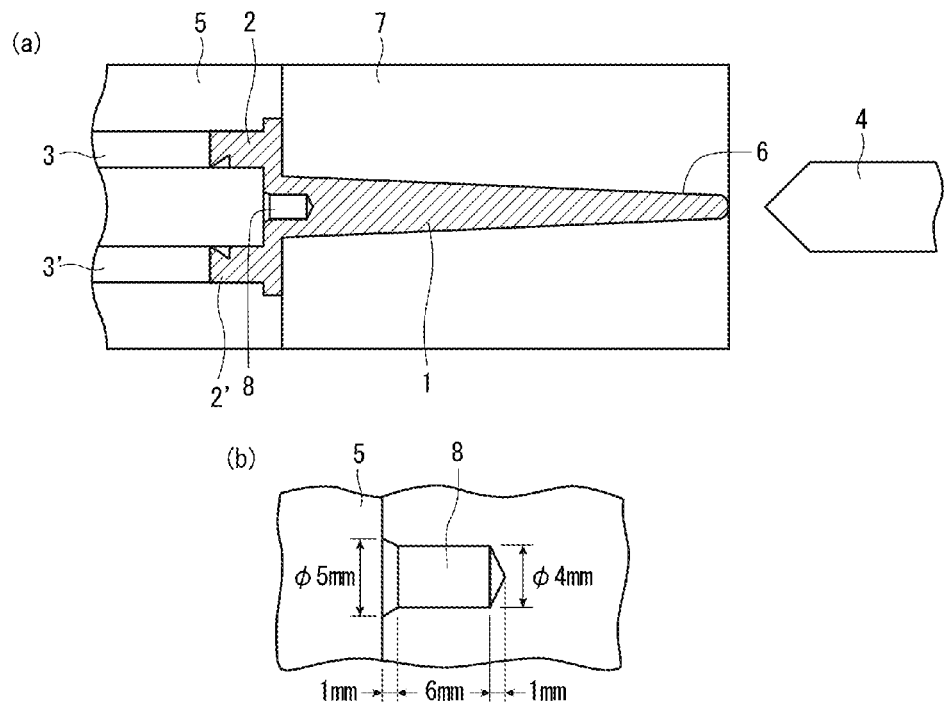
FIG. 2 is a schematic view

FIG. 2(a) is a cross-sectional view that shows the state of the test piece 1 inside the mold, as seen from the upper side in FIG. 1. A resin is injected into a fixed side mold 7 from an injection molding machine 4 and passes through a spool runner part 6, thereby forming the test piece 1 in a cavity between the fixed side mold and the movable side mold 5. A core pin 8 is provided in the movable side mold 5, and this core pin 8 is disposed so as to protrude into A in the spool runner part 6 of the test piece 1. The core pin 8 has the shape and dimensions shown in FIG. 2(b), and because the core pin 8 is present, mold release resistance is increased at the time of mold release.

The test method involved pushing the ejector pins 3 and 3' against the parts 2 and 2' of the test piece 1 from the movable side mold 5 while altering the cooling time following injection molding from 10 seconds to a minimum of 3.5 seconds at 0.5 second intervals, and observing whether or not the test piece 1 could be released without deforming. Release is of course easier if cooling is carried out for a long period of time, but in this evaluation, it was observed how short the cooling time could be in order for the test piece to be correctly released, and mold release properties were evaluated by means of the number of seconds in the cooling time. A shorter cooling time means that mold release properties are good and the molding cycle can be shortened.

Because the measured time for this molding was approximately 3.3 seconds, the minimum cooling time was taken to be 3.5 seconds.

The evaluation results above are shown in Table 2 below.

TABLE 2

|  |  | Example | | | | | | Comparative Example | | |
|---|---|---|---|---|---|---|---|---|---|---|
|  |  | 1 | 2 | 3 | 4 | 5 | 6 | 1 | 2 | 3 |
| Polycarbonate resin (A) | A1 | 91.2 | 91.2 | 91.2 | 91.2 | 91.2 | 91.2 | 91.2 | 91.2 | 91.2 |
|  | A2 | 8.8 | 8.8 | 8.8 | 8.8 | 8.8 | 8.8 | 8.8 | 8.8 | 8.8 |
| Polyalkylene glycol (B) | B1 | 0.25 | 0.50 | 0.75 |  |  |  | 1.00 |  |  |
|  | B2 | 0.75 | 0.50 | 0.25 |  |  |  |  | 1.00 |  |
|  | B3 |  |  |  | 1.00 |  |  |  |  |  |
|  | B4 |  |  |  |  | 0.80 | 1.00 |  |  |  |
| Polyalkylene glycol (X) | X1 |  |  |  |  |  |  |  |  | 0.60 |
|  | X2 |  |  |  |  |  |  |  |  | 0.20 |
|  | X3 |  |  |  |  |  |  |  |  | 0.20 |
| Phosphorus-containing stabilizer (C) | C1 | 0.05 | 0.05 | 0.05 | 0.05 | 0.05 | 0.05 | 0.05 | 0.05 | 0.05 |
| mol % of (b1) to (b3) in polyalkylene glycol (B) | b1 | 57.0 | 52.7 | 48.8 | 56.3 | 58.1 | 58.1 | 45.1 | 61.7 | 51.0 |
|  | b2 | 27.5 | 17.6 | 8.4 | 20.3 | 30.1 | 30.1 | — | 38.3 | 21.1 |
|  | b3 | 15.5 | 29.7 | 42.8 | 23.4 | 11.8 | 11.8 | 54.9 | — | 27.9 |
| YI (300 mm) |  | 16.9 | 14.4 | 13.7 | 13.7 | 14.8 | 16.2 | 14.9 | 14.0 | 14.5 |
| ΔYI (95° C., after 700 hours) |  | 6.4 | 5.8 | 6.8 | 5.1 | 5.9 | 5.2 | 5.7 | 9.1 | 6.5 |
| Shortest time for release (sec) |  | 3.5 | 3.5 | 3.5 | 3.5 | 3.5 | 3.5 | 6.5 | 3.5 | 8.0 |

INDUSTRIAL APPLICABILITY

The polycarbonate resin composition for an optical component of the present invention exhibits excellent transparency, thermal discoloration resistance and mold release properties, and can therefore be advantageously used in optical components in particular, and exhibits extremely high industrial applicability.

The invention claimed is:

1. A polycarbonate resin composition, comprising:
   100 parts by mass of a polycarbonate resin (A),
   0.1 to 4 parts by mass of a polyalkylene glycol (B), and
   0.005 to 0.5 parts by mass of a phosphorus-comprising stabilizer (C),
   wherein the polyalkylene glycol (B) comprises 52.7 to 80 mol % of a tetramethylene glycol unit (b1), 5 to 45 mol % of a (2-methyl)ethylene glycol unit (b2), and 5 to 50 mol % of an ethylene glycol unit (b3), and
   wherein the polyalkylene glycol (B) is characterized by being contained as a copolymer having the tetramethylene glycol unit (b1), the (2-methyl)ethylene glycol unit (b2), and the ethylene glycol unit (b3).

2. The polycarbonate resin composition of claim 1, wherein the polyalkylene glycol (B) comprises 52.7 to 80 mol % of the tetramethylene glycol unit (b1), 17.6 to 45 mol % of the (2-methyl)ethylene glycol unit (b2), and 5 to 29.7 mol % of the ethylene glycol unit (b3).

3. The polycarbonate resin composition of claim 1, wherein the tetramethylene glycol unit (b1) is present in an amount of 52.7 to 58.1 mol % in the polyalkylene glycol (B).

4. The polycarbonate resin composition of claim 1, wherein the (2-methyl)ethylene glycol unit (b2) is present in an amount of 17.6 to 30.1 mol % in the polyalkylene glycol (B).

5. The polycarbonate resin composition of claim 1, wherein the ethylene glycol unit (b3) is present in an amount of 13.7 to 29.7 mol % in the polyalkylene glycol (B).

6. The polycarbonate resin composition of claim 1, wherein a number average molecular weight of the polyalkylene glycol (B) is more than 1200 and less than 5000.

7. An optical component obtained by a process comprising molding the polycarbonate resin composition of claim 1.

* * * * *